US006103329A

United States Patent [19]

Hiserote

[11] Patent Number: 6,103,329

[45] Date of Patent: Aug. 15, 2000

[54] MINIATURE MOSAIC AND METHOD

[76] Inventor: Laura B. Hiserote, P.O. Box 87872, Vancouver, Wash. 98687-7872

[21] Appl. No.: 09/315,873

[22] Filed: May 20, 1999

[51] Int. Cl.[7] .......... B32B 3/14

[52] U.S. Cl. .......... 428/49; 428/48; 156/63

[58] Field of Search .......... 428/49, 48, 47; 156/63

[56] References Cited

U.S. PATENT DOCUMENTS 602,159 4/1898 Harrison et al. .......... 428/47

OTHER PUBLICATIONS

*XVIII and XIX Century, Roman Miniature Mosiacs, Domenico Petochi,* English Enclosure, Nov. 1981, pp. 3–24.

*The Gilbert Mosiac Collection,* by Anthony C. Sherman, Pendulum Press, West Haven, Connecticut, Dec. 1971, six pages.

*The Art of Mosiacs, Selections from the Gilbert Collection,* Los Angelos County Museum of Art, Dec. 1977, 37 pages.

*I Mosaici Minuti Romani, dei secoli XVIII e XIX., Domenico Petochi,* Nov. 1981, pp. 7–251.

*XVIII and XIX Xentury, Roman Miniature Mosiacs, Domenico Petochi,* English Enclosure, Nov. 1981, pp. 3–24.

*The Art Mosiacs, Selections from the Gilbert Collection,* Los Angeles County Museum of Art, Dec. 1982, 219 pages.

*Primary Examiner*—Alexander Thomas

*Attorney, Agent, or Firm*—Kolisch, Hartwell, Dickinson, McCormack & Heuser

[57] ABSTRACT

A miniature mosaic is disclosed that includes a support, a plurality of tesserae arranged on the support to create an image where at least a majority of the tesserae are elongate strands having cross-sectional areas of no more than 0.25 square millimeters, and an adhesive fixing the tesserae to the support. A method of making a miniature mosaic is also disclosed.

20 Claims, 5 Drawing Sheets

MINIATURE MOSAIC AND METHOD

TECHNICAL FIELD

The present invention relates generally to mosaics, and more specifically, to miniature mosaics and to a method of making miniature mosaics.

BACKGROUND OF THE INVENTION

A mosaic is a decorative object made from pieces of hard substances selected and fitted together to form a desired image or design. The earliest mosaics were made of terra cotta or stone fragments held together by a mortar. The number and possible combinations of different types and sizes of materials that may be used to create a mosaic permit a wide range of uses of mosaics. Mosaics have been used as independent pieces of art, and as decoration for architecture, furniture, jewelry, boxes etc. Mosaics also have been used to reproduce important paintings.

Mosaics typically create what may be thought of as a broken image because numerous lines are created between the pieces of the mosaic. One way of addressing this issue is to create mosaics using very small pieces. Mosaics with very small pieces have been called miniature mosaics. Some miniature mosaics are said to include around 1,400 pieces per square inch, possibly with pieces of a dimension less than 1-millimeter. The pieces used in some miniature mosaics apparently were made from what is called smalti or smalto. Smalti refers to opaque colored glass that has been melted in a furnace and poured onto a slab. As the glass slowly cools, it forms a pancake shape, which is then cut into small strips. These, in turn, are hand cut into small rectangles or cubes. Smalti may also be "spun," which is understood to mean that the smalti is formed into threads or strips by melting a piece of smalto over a flame and by then reducing it into rods. The rods then may be split into smaller sections as needed. Spun smalti also may be referred to a smalti filati. It is believed, however, that smalti and spun smalti have been limited to the creation of pieces of a dimension greater than 0.5 millimeter.

This invention concerns miniature mosaics of extreme fineness and detail. The invention also includes a method of making miniature mosaics.

DETAILED DESCRIPTION AND BEST MODE FOR CARRYING OUT THE INVENTION

Figure 1:
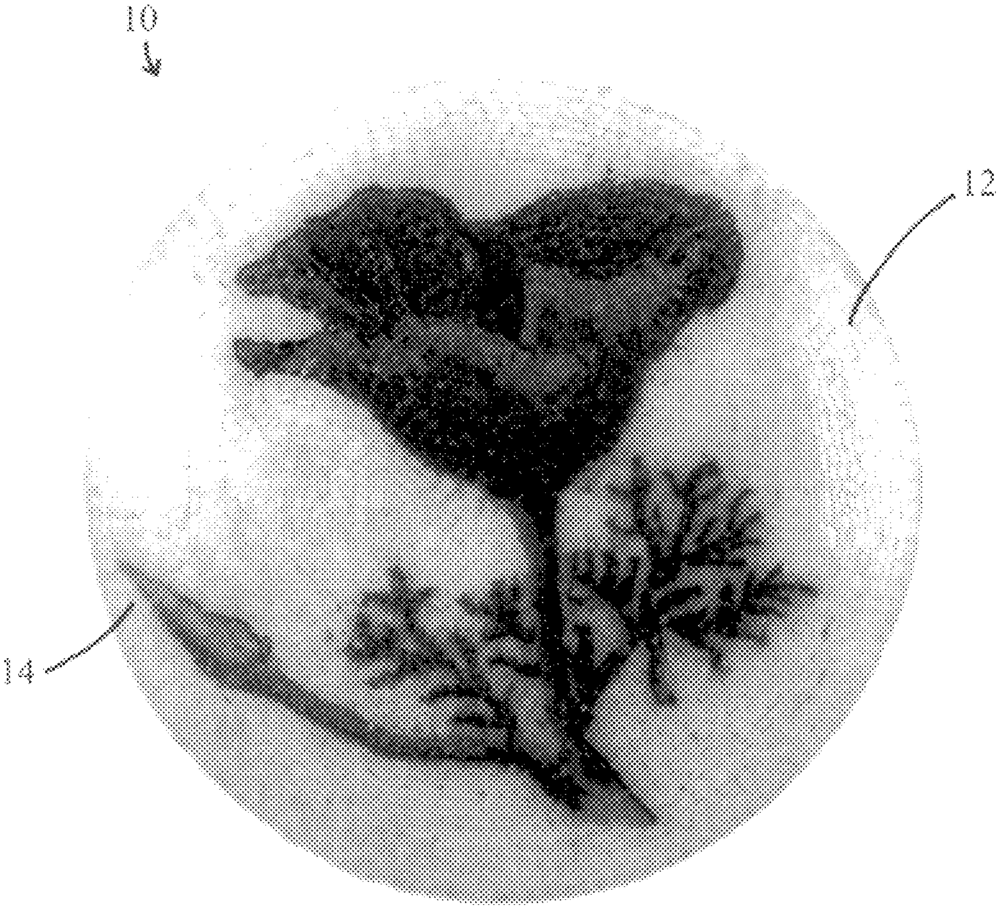
FIG. 1 is a digitized copy of a photograph of a miniature mosaic according to the present invention.

FIG. 1 is a digitized copy of a photograph of a miniature mosaic. The image shown at 10 in FIG. 1 is enlarged from the actual mosaic. The actual mosaic is approximately 2.1-centimeters in diameter. The mosaic shows an image of a California poppy on a stem. The poppy, stem and background in the actual mosaic are brightly colored. The mosaic is intended for mounting in a piece of jewelry such as a broach. The poppy shown in mosaic 10 in simply one of an infinite number of images, designs and colors that may be presented by a mosaic. Just as the mosaic itself is simply one of an infinite number of sizes and shapes that a mosaic may take.

Mosaic 10 is made of numerous, small pieces of material, such as pieces 12 and 14. A piece like piece 12 is often called a tessera, the plural of which is tesserae. Tesserae are placed side-by-side in a mosaic to create an image, as will be discussed in more detail below. There are approximately 4040 tesserae in the mosaic shown at 10 in FIG. 1.

Figure 2:
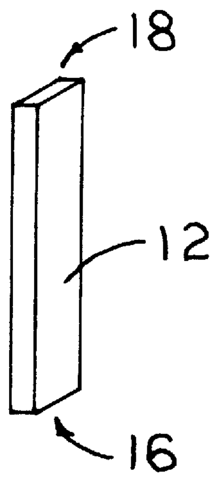
FIG. 2 is a view of a tessera.

Tessera 12 is shown by itself in FIG. 2. Tessera 12 is elongate, with a first end 16 and a second end 18. Tessera 12 is made to have a rectangular cross section as shown. In the present invention, tessera 12 has a cross section of 0.07-millimeter by approximately 0.18-millimeter. Of course, the size of the tessera may vary. However, in the miniature mosaics of the present invention, a majority of tesserae in a mosaic typically have cross-sectional areas of no more than 0.25 square millimeters. The cross-sectional area of tessera 12 shown in FIG. 2 is approximately 0.0126 square millimeters. The small size and cross-sectional area of the tessera of the present invention is important so that the miniature mosaic may include extremely fine detail and vibrant and life-like color, and so that an image presented by the miniature mosaic appears substantially continuous. Tessera 12 is approximately 4 millimeters long, but may range from 2 to 5 millimeters long, and even longer in some applications. Tessera may be referred to as an elongate strand.

Figure 3:
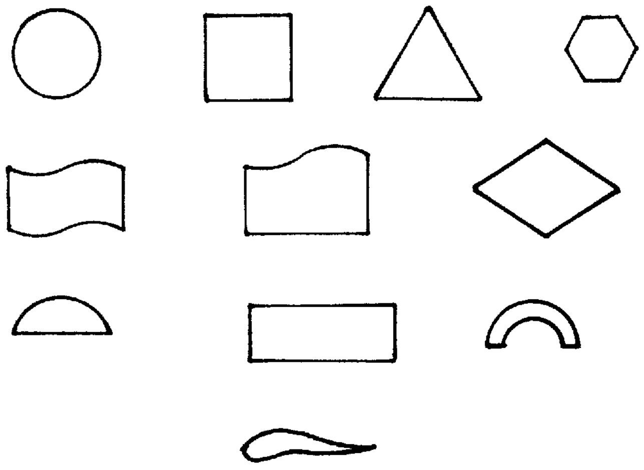
FIG. 3 shows various cross-sectional shapes of tesserae.

The tesserae in the present invention may take any number of cross-sectional shapes. FIG. 3 shows various cross-sectional shapes for tesserae. Different cross-sectional shapes are used to obtain different images in the mosaic, to fit the tesserae closely together in the mosaic, and to produce different effects in the image. For example, some tesserae may be shaped to resemble strands of fur, while other tesserae may be shaped to form part of an eye. The cross-sectional shapes shown in FIG. 3 are simply illustrative of the many cross-sectional shapes that are possible.

Figure 4:
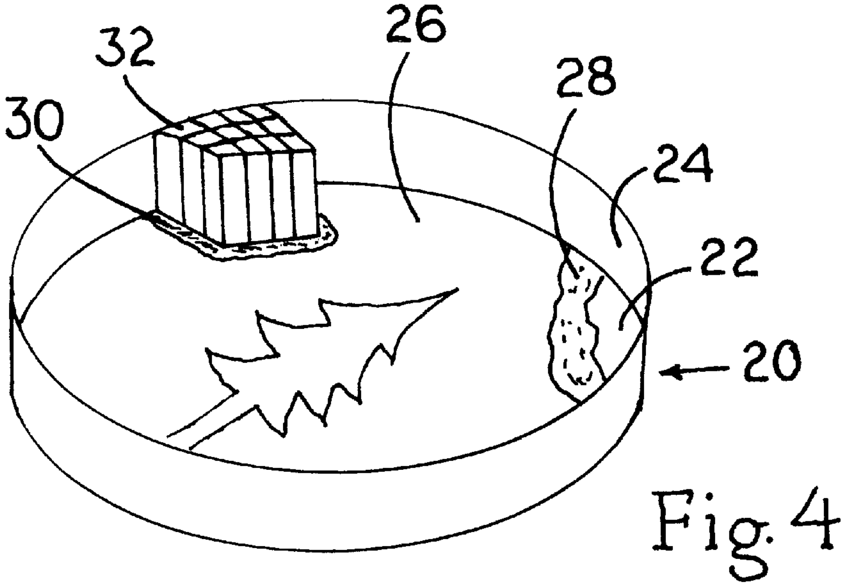
FIG. 4 shows a mosaic in the process of being made.

A miniature mosaic, such as mosaic 10 in FIG. 1, is made from numerous tesserae placed on the base of a support or housing. A support is shown in FIG. 4 at 20. The support includes a base 22, which may be thought of as the bottom of the support. Base 22 has an outer edge, and a wall or lip 24 is attached along the edge of the base. Lip 24 extends upwardly and away from the base to define a region in which the mosaic will be created. The base and lip support the tesserae that will be placed in the region defined by the lip. Support 20 is typically made of metal, such as gold, platinum, silver, aluminum or copper, and may also be made of other materials such as glass, stone or wood. Lip 24 may be soldered, mechanically connected to, or integral with base 22. The base and lip are shaped so that they have the shape desired for the miniature mosaic. Lip 24 typically ranges from 2 to 4 millimeters in height, and may vary in thickness according to the demand for strength required by the design of the miniature mosaic. Base 22 can be flat or contoured depending on the design of the miniature mosaic and the intended use of the miniature mosaic.

FIG. 4 helps illustrate how a miniature mosaic is made. An image 26 is fixed to base 22 by an adhesive or epoxy 28.

Image 26 may be virtually any image, and typically is an original design or drawing in color. In the depicted embodiment, the image is a tree. An original drawing may be made on paper, and the paper drawing would then be scanned and digitized into a computer. The image may then be reduced to a desired size by appropriate software on the computer. The reduced image then may be printed in color on paper or some other sheet medium. In this manner, an artist may create an image or drawing, and the drawing may then be reduced for use in making a miniature mosaic. The artist does not need to create an image or drawing in the size desired for the miniature mosaic. The reduced image acts as a guide or template for an artist making a miniature mosaic.

Image 26 will eventually be completely covered by tesserae placed over the image, as will be explained. The adhesive or epoxy holding image 26 to base 22 is allowed to thoroughly cure before continuing with the assembly of the miniature mosaic.

After the adhesive attaching the printed image to the support is completely cured, the next steps in the process of making a miniature mosaic can begin. A supply of tesserae is provided for use in the mosaic. The tesserae may be sorted by size and/or cross-sectional shape. The tesserae may be sorted in trays on risers on a turntable to allow for easy access to the tesserae.

An artist first applies an adhesive, preferably epoxy, such as epoxy 30 shown in FIG. 4, on a small portion of image 26. The epoxy is placed directly on the printed image 26, but only over a small portion of the image. An artist then selects a single tessera 32 suited for placement along the outer-most edge of the image against lip 24. Tessera 32 is placed so that its first end is in epoxy 30 and the epoxy holds the tessera in place. Additional tesserae are then placed side-by-side until the tesserae cover epoxy 30. The tesserae are placed one at a time, and they are placed as close to each other as possible. As shown in FIG. 4, the tesserae placed on base 22 vertically or standing upright. The second ends or uppermost ends of the tesserae are what forms the desired image of the mosaic. The color, shape and size of each tesserae is dictated by the image. High quality tweezers may be used to select and place the tesserae. This portion of the epoxy is then allowed to cure. When cured, an additional portion of epoxy is applied directly to image 26 adjacent the portion previously placed, and tesserae are again applied to the epoxy. This process is repeated until the housing or support is completely filled with tesserae.

A user may place the tesserae on the base using magnifying glasses, a jeweler's magnifying loop, or a microscope, such as a Stereo Microscope 20× with illumination sold by Edmund Scientific Company of Barrington, N.J. A stereo microscope has the advantage of allowing a user to use both eyes when placing the tesserae.

Alternatively, an artist may dip the first end of each tessera into the epoxy, and then place the tessera on the base. In this alternative, portions of epoxy do not need to be applied on image 26.

Figure 5:
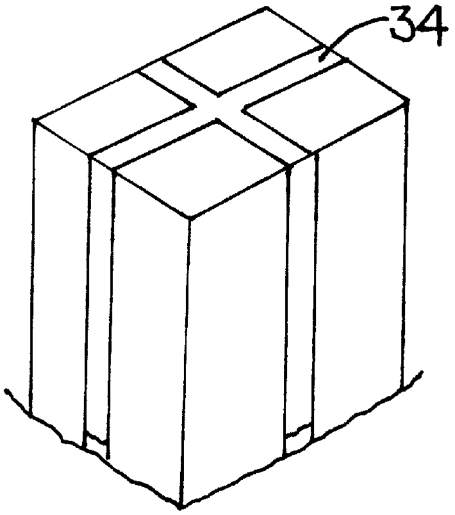
FIGS. 5 illustrates a part of a miniature mosaic and a pail of a method of making miniature mosaics.

After all the tesserae have been placed in the support, the surface of the mosaic will be rough and must be surfaced. The process of surfacing begins by filling any spaces between the tesserae with a water-soluble wax. Spaces, if any, between the tesserae are quite small, but nonetheless, must be filled so that the tesserae are supported when they are surfaced. The wax used in the preferred method is a water soluble wax that melts only at relatively high temperatures, such as above 200° Fahrenheit. A water soluble wax is used so that the wax, and any undesired particulate matter that becomes embedded in the wax during the surfacing process, may be easily removed. The wax is heated and worked into the spaces between the tesserae. A tool known as an Ultra-Waxer may be used for this purpose. An Ultra-Waxer is an electronically controlled heating applicator that allows for the precise control of heat. Ultra-Waxers are available from Ultra-Waxers are available from Ultra-Waxer of Glendora, Calif. FIG. 5 shows wax 34 filling spaces between four tesserae.

Figure 6:
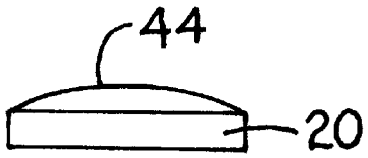
FIG. 6 is a simplified side view of a miniature mosaic.

When the spaces between the tesserae are filled with wax, then the tesserae are surfaced by using an abrasive, such as micron graded abrasive finishing sheets. The second ends of the tesserae are sanded with the abrasive until they are even and the surface of the mosaic is somewhat smooth. The surface of the mosaic may be sanded flat or contoured depending upon the desired affect and final desired shape of the mosaic. FIG. 6 shows a side view of a mosaic with a support 20, and a surface 44 of the mosaic contoured in a shape similar to a dome. The surfacing or polishing process continues by using finer and finer grit abrasive until the desired polish is achieved. Abrasive sheets used may range from 400 grit to 8000 grit, and such sheets are available from 3M. It is noted that a polish known as boshuko produces a fine and desirable final polish. Boshuko may be obtained from a company called Enamelwork Supply Co. of Seattle, Wash.

When the mosaic is sufficiently surfaced and polished, the wax in the spaces between the tesserae must be removed because the wax will now contain particles produced from the surfacing process, and that wax and those particles will lessen the quality of the image presented by the mosaic. The wax is easily removed because it is water soluble. Preferably, the wax is removed by directing pressurized steam onto the surface of the mosaic. The steam melts the wax and carries the wax and any undesirable particles away.

Once the wax and grit has been cleaned from the spaces between the tesserae, the spaces must be filled again with wax to both support the tesserae and to improve the quality of the image. This is accomplished in the same manner as previously described, but water soluble wax is not needed. A wax that melts at relatively high temperatures, such as above 200° Fahrenheit, is preferred. A possible wax may be a translucent, medium hard wax.

There may be a need for colored wax to fill spaces between certain tesserae to improve the quality of the image presented by the mosaic. The need for colored wax is dictated by the desired effect of the image. Colored wax can be used to fill all spaces between tesserae, or only certain spaces. The colored wax may simply be wax mixed with dry artist pigments. If it is determined that colored wax is to be used, then a thin layer of any existing wax may be removed to provide a space for the colored wax. This may be accomplished by placing an absorbent sheet, such as a paper towel, over the surface of the mosaic where the colored wax is to be applied. A heated applicator is then applied to the paper towel and mosaic, causing a thin layer of wax to become fluid and to be soaked up by the paper towel. This process may be done to the entire surface, or to portions of the surface. The colored wax is applied to the desired areas by using a heated applicator, as described above.

Figure 7:
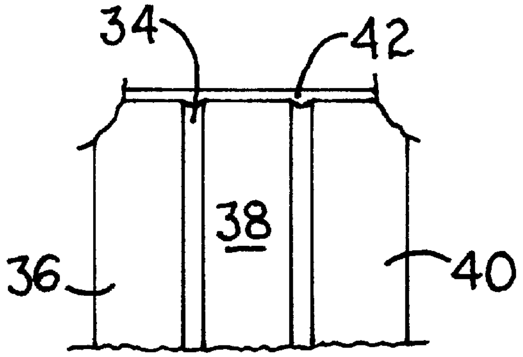
FIG. 7 shows part of a miniature mosaic.

All excess wax from the surface of the mosaic is then removed by gently scraping it away. The surface of the mosaic is then gently polished or rubbed until the surface feels smooth and the second ends of the tesserae are free of wax. It has been discovered that this rubbing is best done by hand with very clean fingers. A thin layer of clear acrylic is then applied over the wax and tesserae to protect the wax from becoming soiled. FIG. 7 shows tesserae 36, 38 and 40 with wax 34 filling the spaces between the tesserae, and a thin layer of acrylic 42 applied over the wax and tesserae.

Figure 8:
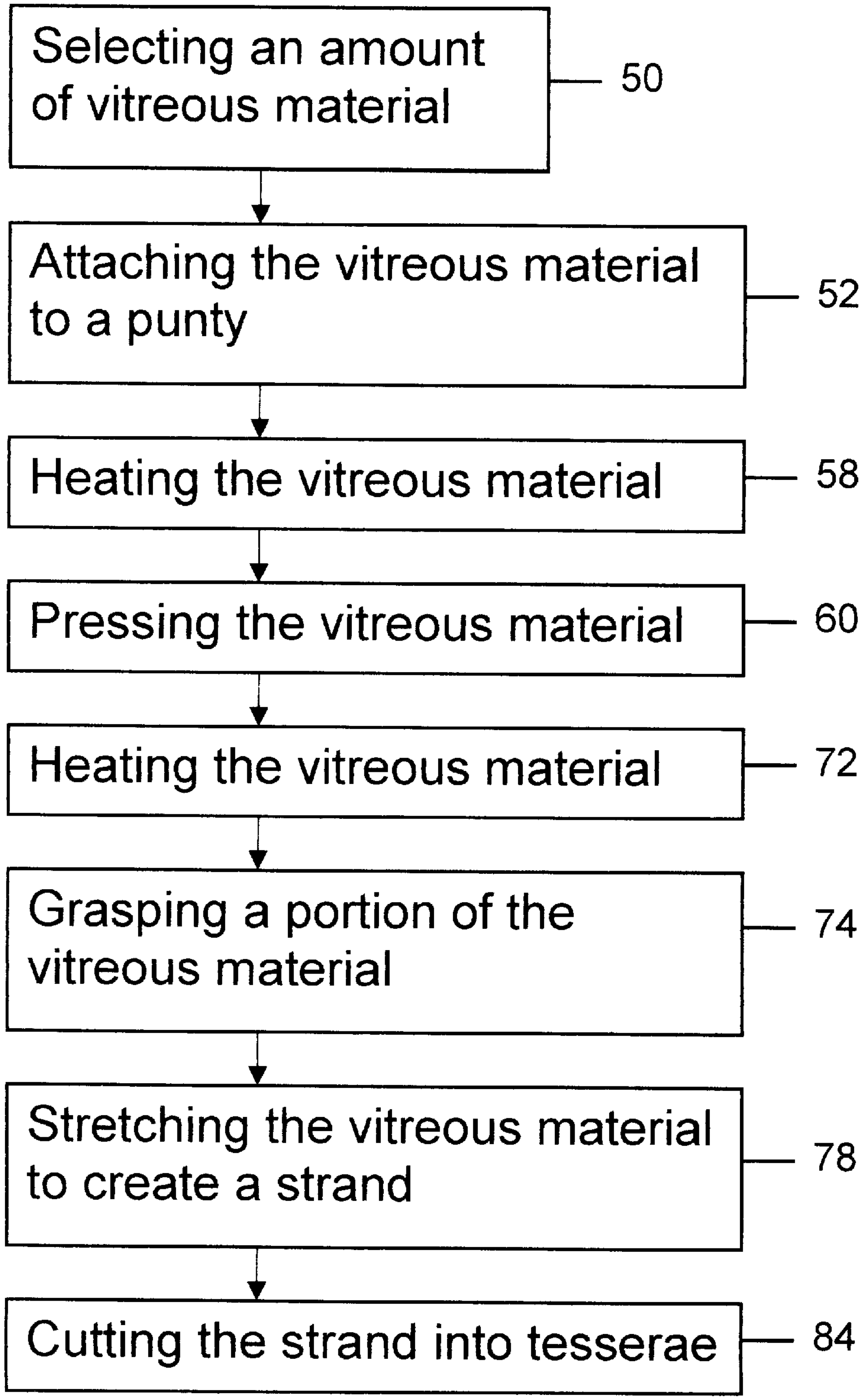
FIG. 8 is a flow chart of a method of making miniature mosaics.

The tesserae of the present invention are unique in that they are extremely small. Their extreme small sizes allow for the surprising result of remarkable detail and realism. The tesserae may be thought of as elongate strands because of their small size. The tesserae are typically made of a vitreous material such as glass or enamel. Acceptable glass and enamel are available from companies such as Orsoni Enamel (having a distributor located in Castleton, Vt.), Moretti Glass (having a distributor in Seattle, Wash.), Bullseye Glass of Portland, Oreg., and Thompson Enamel (having a distributor in Shelton, Wash.). FIG. 8 is a flow chain of the general process of making the tesserae used in the invented miniature mosaic. First, a small amount of vitreous material is selected, typically in the range of 2 to 4 grams of material. The material often comes as a solid in a small, block-like shape, but it may come in other forms. The material is then heated by placing it in a pan on a hot plate or on a shelf in a kiln. The material is heated to a predetermined temperature that will prevent the material from suffering thermal shock when the material is placed in a flame. This temperature varies depending on the type of material.

Figure 9:
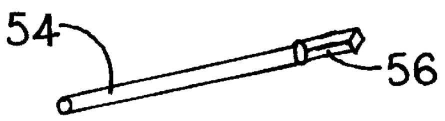
FIG. 9 shows a punty with vitreous material attached thereto.

A selected portion of the material is then further heated so that it may be stuck to the end of a warmed metal or glass punty. Attaching the vitreous material to a punty is identified in box 52 in FIG. 8, and a block of vitreous material 56 is shown attached to a punty 54 in FIG. 9.

A person then holds the punty and places the vitreous material into a flame to further heat the material to a point where the material is softened and malleable. A surface mix oxygen propane torch is used to heat the vitreous material to the softening temperature. Using a surface mix torch is important because it prevents the vitreous material from oxidizing when it is heated. It also allows for precise control of temperature, which facilitates heating the glass so that it is soft without overheating, shocking or burning color from the glass. A Minor Bench Burner surface mix oxygen propane torch is an example of an acceptable surface mix torch, and it is available through Frantz Bead Co., Inc. in Shelton, Wash. This heating of the vitreous material is represented by box 58 in FIG. 8.

Figure 10:
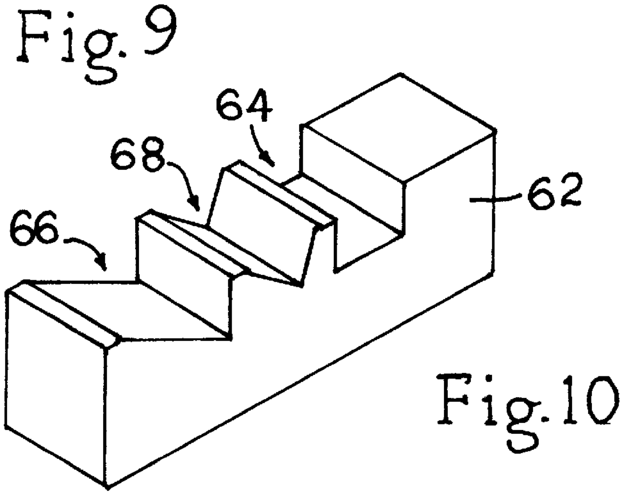
FIGS. 10 and 11 show a mold for shaping vitreous material.
Figure 11:
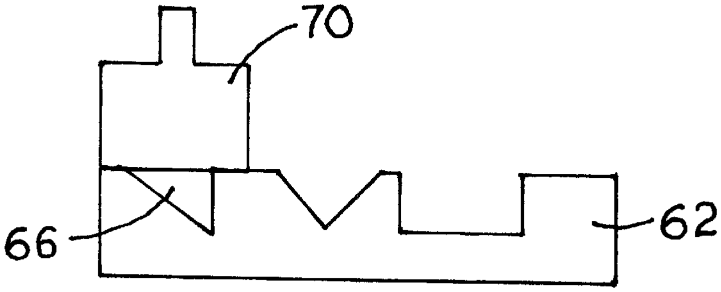

At this point, the vitreous material is moved to a mold where it is pressed into a desired cross-sectional shape. This must be done quickly to avoid excessive cooling of the material. This step is represented by box 60 in FIG. 8. A preferred mold is shown at 62 in FIG. 10. Mold 62 is made of graphite to prevent the vitreous material from sticking to the mold. Mold 62 includes three indentations of various shapes, such as indentation 64 in the shape of a rectangle, and indentations 66 and 68 in the shape of triangles. The indentations are used to press the vitreous material into various cross-sectional shapes. FIG. 11 shows mold 62 with a block 70. Block 70 may be thought of as a compressor in that it may be used to press against any vitreous material placed in an indentation in the mold so that the material assumes the shape of the indentation. FIG. 11 shows block 70 spanning across the top of indentation 66, so that any vitreous material placed in the indentation will be pressed into a triangular shape. Block 70 may be similarly used with indentation 64 and 68. Alternatively a hand tool, such as tool 71 shown in FIG. 12 may be used to press the vitreous material into a desired shape. Tool 71 is similar to a pair of pliers except that tool 71 is equipped with a graphite mold on its jaws.

Once pressed, the vitreous material is again heated by the flame of the surface mix torch as represented by box 72 in FIG. 8. The material is heated sufficiently to bring it to its softening point, but not so much that it softens or distorts the shape into which the material has been pressed. As soon as the material is heated to its softening point, it is removed from the flame and allowed to cool for a very brief period of time, typically not more than one second. This pause is believed to be necessary to allow the material to form a cooled outer layer or skin that will cause the material to maintain its pressed shape during subsequent processing.

Figure 12:
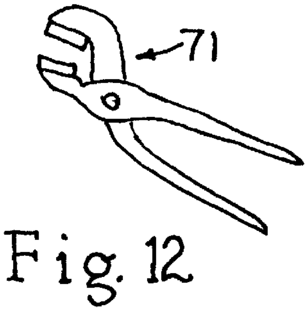
FIG. 12 shows a type of mold.
Figure 13:
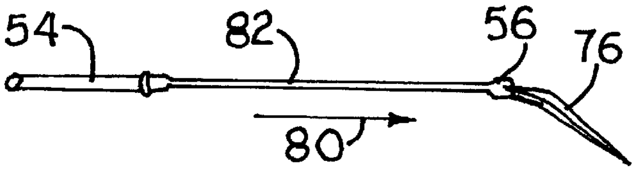
FIG. 13 shows part of the process of making tesserae.

After this brief pause, a portion of the vitreous material away from the punty is grasped by tweezers or some other mechanism, such as by tool 71 in FIG. 12, and as represented by box 74 in FIG. 8. The grasped portion of the vitreous material is then quickly pulled or stretched away from the punty, as shown by box 78 in FIG. 8. FIG. 13 shows a punty 54 with the vitreous material 56 having been grasped by tweezers 76 and stretched in the direction of arrow 80. This pulling or stretching produces a thin strand 82 of the vitreous material. The cross-sectional shape of strand 82 is the same as the cross-sectional shape of the vitreous material prior to the material having been stretched. The thickness of strand 82 is dependent on the speed at which the vitreous material is pulled or stretched. The slower the material is pulled, the thicker strand 82 will be. The faster the material is pulled, the thinner the strand will be. Care must be taken in determining the pause time before the vitreous material is pulled. If too much time elapses, the material will become brittle and break when pulled. If too little time elapses, the material will not retain its pressed shape. This time varies with each type of vitreous material used. The appropriate pause for various materials, and the speed at which one pulls the material, are learned from experience over time.

Once pulled, strand 82 will cool rapidly, depending on its thickness. Strand 82 may then be broken away from the portions of vitreous material 56 adjacent the punty and the tweezers, resulting in a long strand of substantially uniform cross section. The strand may then be snipped or cut into individual tesserae, as represented by box 84 in FIG. 8. Individual tesserae typically range in length from 2 to 5 millimeters, and may be sized for the desired mosaic.

This process of forming tesserae is repeated for each desired shape and thickness of the tesserae. The process is also repeated for each desired color of tesserae. It should be noted that the tesserae may be of any color or combinations of colors.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims also are regarded as included within the subject matter of the present invention irrespective of whether they are broader, narrower, or equal in scope to the original claims.

I claim:

1. A method of making a miniature mosaic, the method comprising:

providing a base;

providing a plurality of tesserae, where the tesserae are elongate strands having cross-sectional areas of no more than 0.25 square millimeters, and each strand having first and second ends;

selecting tesserae to be used in the mosaic from the plurality of tesserae provided;

fixing the first ends of the selected tesserae to the base by an adhesive so that the selected tesserae extend away from the base, so that the selected tesserae are side-by-side, and so that the second ends of the selected tesserae form a desired image; and surfacing the second ends of the selected tesserae.

2. The method of claim 1 where the base includes an edge, and further comprising a lip extending along the edge and away from the base, where the limitation of placing the first ends of the selected tesserae begins by first placing tesserae against at least a portion of the lip and then continuing to place other tesserae.

3. The method of claim 1 further comprising:

providing an image;

fixing the image to the base; and using the image as a guide in placing tesserae.

4. The method of claim 3 where the limitation of providing an image comprises producing an image, reducing the image to a size corresponding to the desired sized of the mosaic, and printing the reduced image on a sheet.

5. The method of claim 4 where the limitation of fixing the image to the base comprises using epoxy to fix the sheet to the base.

6. The method of claim 1 where the limitation of providing a plurality of tesserae comprises:

selecting an amount of vitreous material;

heating the vitreous material to a temperature sufficient to allow the material to be pressed into a desired shape;

pressing the heated vitreous material into a desired cross-sectional shape;

heating the pressed vitreous material to a temperature sufficient to soften the material but insufficient to distort the shape of the material;

stretching the vitreous material by pulling portions of the material away from each other to create a strand; and cutting the strand into tesserae.

7. The method of claim 6 where the limitation of heating the vitreous material to a temperature sufficient to allow the material to be pressed into a desired shape is accomplished by use of a surface mix torch.

8. The method of claim 6 where the limitation of pressing the heated vitreous material into a desired shape is accomplished by a graphite mold.

9. The method of claim 6 further comprising allowing the vitreous material to cool for less than 2 seconds between the steps of heating the pressed vitreous material and stretching the vitreous material.

10. The method of claim 6 where the limitation of stretching includes stretching the vitreous material at a rate to create a strand having a portion of substantially uniform cross-sectional area of less than 0.25 square millimeters.

11. The method of claim 1 where the limitation of surfacing the second ends of the tesserae comprises:

filling spaces between tesserae with a wax;

abrading the second ends of the tesserae;

removing the wax and particles resulting from the abrading;

re-filling the spaces between the tesserae with wax; and cleaning the surface defined by the second ends of the tesserae.

12. The method of claim 1 further comprising applying acrylic onto the second ends of the selected tesserae.

13. A miniature mosaic comprising:

a support;

a plurality of tesserae arranged on the support to create an image, where at least a majority of the tesserae are elongate strands, each strand having a first end placed in the adhesive and a second end distal from the adhesive, and where at least a majority of the tesserae have cross-sectional areas of no more than 0.25 square millimeters; and an adhesive fixing the tesserae on the support.

14. The miniature mosaic of claim 13 where the adhesive is epoxy.

15. The miniature mosaic of claim 13 were at least some of the tesserae are of a vitreous material.

16. The miniature mosaic of claim 13 where at least some of the tesserae that have a cross-sectional area of no more than 0.25 square millimeters have varying cross-sectional shapes.

17. The miniature mosaic of claim 13 where at least some of the tesserae that have a cross-sectional area of no more than 0.25 square millimeters are stretched strands of vitreous material molded to have predetermined cross-sectional shapes.

18. The miniature mosaic of claim 13 where at least some of the tesserae have cross-sectional areas of no more than 0.025 square millimeters.

19. The miniature mosaic of claim 13 further comprising wax between at least some tesserae.

20. The miniature mosaic of claim 13 further comprising an acrylic over the surface of the mosaic.

* * * * *